(12) United States Patent
Grady et al.

(10) Patent No.: US 11,829,899 B2
(45) Date of Patent: Nov. 28, 2023

(54) PACKAGE ROOM SYSTEMS AND METHODS

(71) Applicant: PACKAGE SOLUTIONS, INC., Atlanta, GA (US)

(72) Inventors: James D. Grady, Atlanta, GA (US); Orgesi Pandeli, Atlanta, GA (US); Klevis Pandeli, Korce (AL); Ervin Kostandini, Tirane (AL); Kurt Brooks Uhlir, Roswell, GA (US); Marvin Banks, Atlanta, GA (US); Jared Levitt, Atlanta, GA (US); Janet Baker, Norcross, GA (US)

(73) Assignee: PACKAGE SOLUTIONS, INC., Atlanta, GA (US)

( * ) Notice: Subject to any disclaimer, the term of this patent is extended or adjusted under 35 U.S.C. 154(b) by 770 days.

(21) Appl. No.: 15/484,865

(22) Filed: Apr. 11, 2017

(65) Prior Publication Data
US 2017/0293885 A1    Oct. 12, 2017

Related U.S. Application Data

(60) Provisional application No. 62/321,061, filed on Apr. 11, 2016.

(51) Int. Cl.
*G06Q 10/0836* (2023.01)
*G07C 9/00* (2020.01)
(Continued)

(52) U.S. Cl.
CPC ..... *G06Q 10/0836* (2013.01); *G06K 7/10009* (2013.01); *G06T 7/70* (2017.01);
(Continued)

(58) Field of Classification Search
CPC .......... G06K 7/10009; G06K 7/10237; G06K 7/10247; G06Q 10/0836; G06Q 20/3278;
(Continued)

(56) References Cited

U.S. PATENT DOCUMENTS 5,219,258 A     6/1993  Yeakley
9,786,141 B2 *  10/2017 Grabham ............... G08B 25/08
(Continued)

FOREIGN PATENT DOCUMENTS

CN    203255603 U    10/2013
CN    103577954 A    2/2014
(Continued)

OTHER PUBLICATIONS

International Search Report issued in PCT/US2017/026991 dated Jul. 14, 2017.
(Continued)

*Primary Examiner* — Fahd A Obeid
*Assistant Examiner* — Avia Salman
(74) *Attorney, Agent, or Firm* — FENWICK & WEST LLP

(57) ABSTRACT

A package room system may include at least one shelf, at least one sensor configured to sense items on the at least one shelf, at least one data entry device, and at least one computer coupled to the at least one sensor and the at least one data entry device. The at least one computer may be configured to receive data concerning a package from the at least one data entry device, detect, from data from the at least one sensor, a location of the package on the at least one shelf, notify a recipient of receipt of a presence of the package and the location of the package, and detect, from data from the at least one sensor, removal of the package from the at least one shelf.

14 Claims, 12 Drawing Sheets

(51) Int. Cl.
  *H04N 7/18* (2006.01)
  *G06T 7/70* (2017.01)
  *G06K 7/10* (2006.01)
  *G08B 13/24* (2006.01)
  *G08B 21/18* (2006.01)

(52) U.S. Cl.
  CPC ..... *G07C 9/00174* (2013.01); *G07C 9/00896* (2013.01); *G08B 13/2454* (2013.01); *G08B 21/18* (2013.01); *H04N 7/183* (2013.01); *H04N 7/188* (2013.01); *G07C 9/00563* (2013.01)

(58) Field of Classification Search
  CPC .......... G08B 13/2454; G08B 21/18; G08B 13/1472; H04N 7/183; H04N 7/188; B65G 1/04; G06T 7/70; G07C 9/00; G07C 9/00174; G07C 9/00563; G07C 9/00896; G03G 21/1657; G06F 19/323; G06F 2212/178; G07G 1/0045; G07G 1/009; G09F 3/0335; G16H 10/65; H01H 2300/032; H04M 2250/04; H04Q 1/138; H04Q 2209/47; H04W 4/008; H04W 4/80; H04W 12/00407; G05B 2219/31197; B60R 2325/103; G01F 9/003; G01G 11/02; G01G 11/04; G01G 11/06; H05B 6/6464; H01L 27/1112; H01L 224/7592; H01L 2224/7692; H01L 2224/7792; H01L 2224/7892; H01L 2224/7992

See application file for complete search history.

(56) References Cited

U.S. PATENT DOCUMENTS

| | | |
|---|---|---|
| 2006/0220787 A1 | 10/2006 | Turner et al. |
| 2009/0322486 A1 | 12/2009 | Gerstel |
| 2011/0166694 A1* | 7/2011 | Griffits .................... G07F 11/72 700/215 |
| 2013/0261792 A1 | 10/2013 | Gupta et al. |
| 2013/0284806 A1* | 10/2013 | Margalit ................ G06Q 30/06 235/382 |
| 2014/0310112 A1 | 10/2014 | Hyde |
| 2015/0186840 A1 | 7/2015 | Torres et al. |
| 2015/0239666 A1 | 8/2015 | Toebes et al. |
| 2015/0371187 A1* | 12/2015 | Irwin ....................... G07F 5/18 705/72 |

FOREIGN PATENT DOCUMENTS

| | | |
|---|---|---|
| CN | 104364806 A | 2/2015 |
| EP | 1357521 A2 | 10/2003 |
| JP | 2008-123494 A | 5/2008 |
| JP | 2010-115264 A | 5/2010 |
| JP | 2013-025378 A | 2/2013 |
| JP | 2015-514256 A | 5/2015 |
| JP | 2016-021202 A | 2/2016 |
| JP | 2016-028981 A | 3/2016 |
| WO | WO 2013/148123 A1 | 10/2013 |

OTHER PUBLICATIONS

Written Opinion issued in PCT/US2017/026991 dated Jul. 14, 2017.
European Patent Office, Extended European Search Report and Opinion, European Patent Application 17782969.4, dated Oct. 30, 2019, 10 pages.
China National Intellectual Property Administration, Second Office Action, CN Patent Application No. 201780033107.8, dated Dec. 17, 2020, 13 pages (with Partial English Translation).
Japan Patent Office, Office Action, JP Patent Application No. 2018-554470, dated Mar. 30, 2021, 12 pages.

* cited by examiner

PACKAGE ROOM SYSTEMS AND METHODS

CROSS-REFERENCE TO RELATED APPLICATION

This application claims priority from U.S. Provisional Application No. 62/321,061, filed Apr. 11, 2016, the entirety of which is incorporated by reference herein.

DETAILED DESCRIPTION OF SEVERAL EMBODIMENTS

Figure 1:
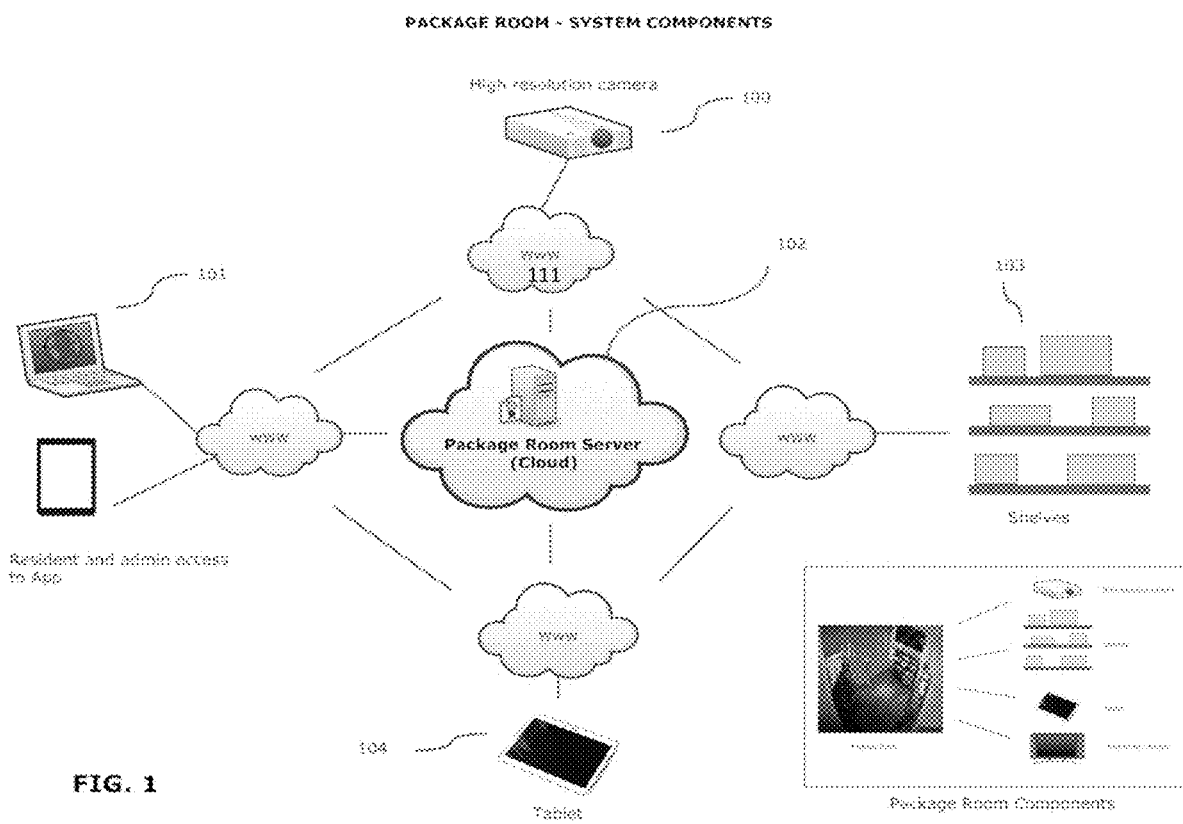
FIG. 1 is an example package room system according to an embodiment of the invention.

Systems and methods described herein may provide secure, automated package room access control and/or tracking. Package rooms may be present in multi-unit dwellings such as apartment or condo complexes, office buildings, and other locations. Package carriers may deliver packages to a package room, and recipients may pick up packages intended for them. The systems and methods described herein may automatically streamline and safeguard this process.

For example, as described in greater detail below, a package room system may include a plurality of bins or shelves. Each bin or shelf may include an electronic lock and a short-range RF data reader, weight sensor, camera, scanner(s), and/or other sensors. The package room may include at least one computer coupled to the electronic locks and sensors of the plurality of bins or shelves. The package room may include at least one data entry device coupled to the at least one computer. The at least one computer may receive data concerning a package to be delivered from the at least one data entry device, unlock one bin of the plurality of bins in which the package is to be placed (when locks are present), notify a recipient of receipt of the package and the one bin or shelf in which it is placed, receive a notification from the sensor associated with the one bin or shelf that the package has been placed in the one bin or shelf, and lock the one bin after the notification is received.

In some embodiments, the at least one computer may receive a signal from the at least one data entry device that the recipient is picking up the package, determine which of the plurality of bins or shelves the package has been placed in, unlock the bin, receive data from the sensor for the one bin or shelf that the package has been removed from the one bin or shelf, and upon receipt from the sensor for the one bin or shelf, relock the one bin.

In some embodiments, the at least one computer may receive data from the at least one data entry device that the package is to be returned, determine a return bin or shelf of the plurality of bins or shelves in which the package is to be placed, and unlock the bin.

A variety of users may interact with the package room, for example the carrier (e.g., UPS, FedEx, etc.), the property management team (e.g., apartment staff), and the package recipient (e.g., the resident).

First, the carrier may bring packages to the package room. This might happen after the carrier attempted delivery at the resident's front door, or the carrier might go straight to the package room. The carrier may enter a code in a keypad, tablet, or other device. If the code is correct, the door to the package room may open, and the carrier may enter the package room. The carrier may use a carrier station to check in the packages. For example, the carrier may use a barcode wand/reader to scan the UPS/FedEx/etc. label. This may bring up the resident's name/instructions on a tablet or computer in the package room. The carrier can see any special notes, such as DO NOT LEAVE IN PACKAGE ROOM, etc. and accept the resident's name, e.g., by clicking yes. The resident may be notified that their package is ready for pickup after a delay (e.g., 10 minutes). This delay may allow the carrier to check in all packages, load the shelving, and re-lock the shelving. The package room may be closed and locked while a carrier is delivering/checking in packages.

Once the carrier has selected yes for the resident (verified the identity, in case there are multiple residents having the same name, for example), a label with a name on front and an RFID tag on the back may print/encode (RFID may encode as it prints) in some embodiments. The carrier may place the labels on the packages. The carrier may place the packages in any open space. The RFID tags may let the system know where the packages are. In some embodiments, weight sensors in the shelves may be used to record the position of the packages in addition to and/or instead of RFID tagging. When the resident comes to collect the package, the system may tell the resident which space to access. When the carrier is done, the carrier can leave the package room. After the carrier leaves, the room may become available again for residents to collect packages. Apartment staff may be able to come in during a carrier visit.

The staff may check the room periodically (e.g., once per day) to make sure everything is in good order and to replace labels (if empty). The staff may rearrange the packages in any way that makes sense or to provide greater space utilization (density), and the system may automatically re-assign the shelf location to the packages. If a package has been left for too long, the staff may be able to see the return date (e.g., the date may be printed on the label) and then either take the package to the office for further processing (e.g., text message, email, phone call, etc. to contact recipient) or simply reprocess it for return to sender. They system may have a location (e.g., one or more shelves) for reverse logistics such as returns of packages. The carrier may take these out when they come to deliver packages.

Once a recipient's package is ready, the recipient may receive a notification (e.g., text message and/or email) notifying them to come to the package room for pickup. They may be given a code to get into the front door of the package room. The recipient may enter this code, or an additional code they are given, into a computer in the package room. Once the shelving code has been entered into the computer, the shelf door with their package may unlock and automatically open. The recipient may look for their name on the label and then remove their package.

Figure 2:
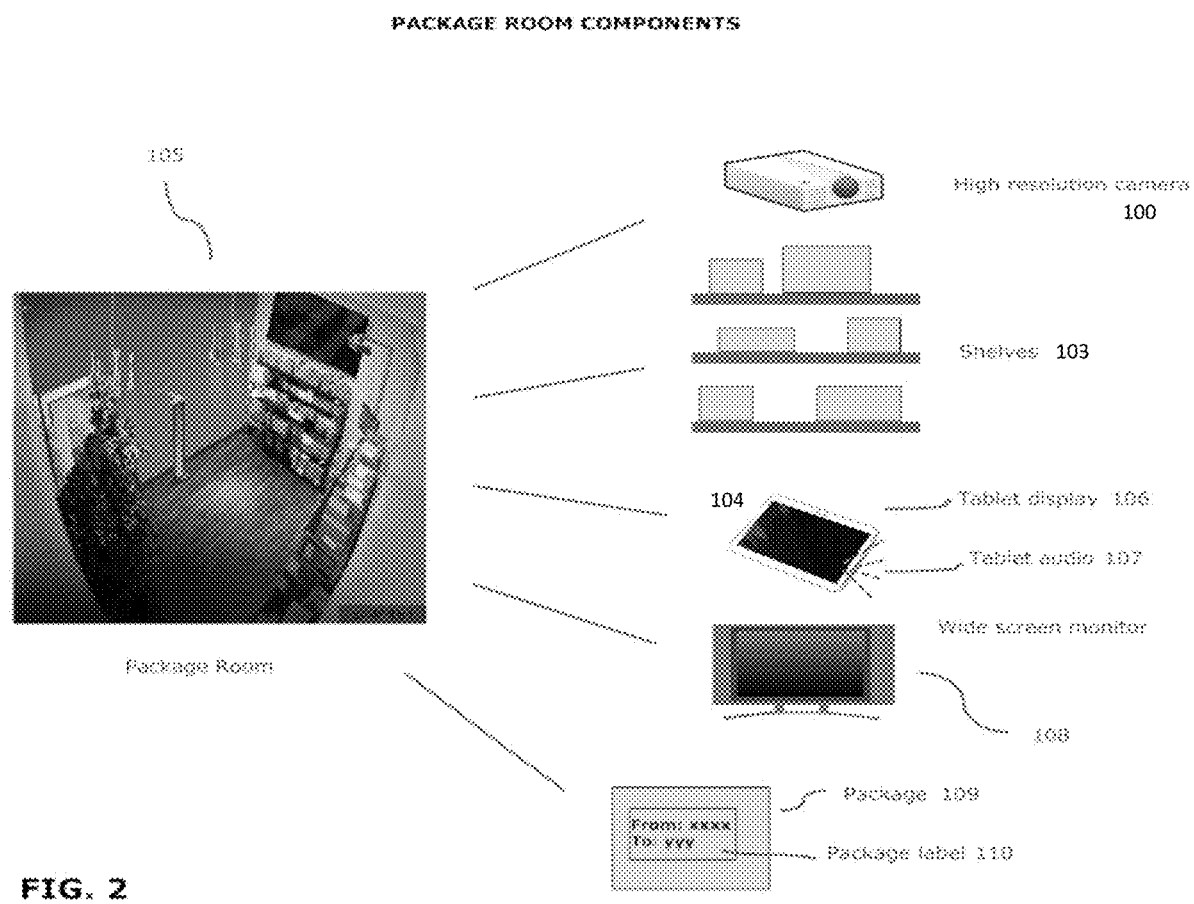
FIG. 2 is an example set of package room components according to an embodiment of the invention.

FIG. 1 is an example package room system, and FIG. 2 is an example set of package room components, according to an embodiment of the invention. While the term "package room" is used herein, some embodiments may not be located in a dedicated room (e.g., package rooms 105 may be portions of rooms or complete structures in themselves such as trailers or outbuildings). Package room 105 may include a variety of components. For example, package room 105 may include one or more cameras 105 configured to sense packages 109, users, etc., as described below. Package room 105 may include shelves 103 and/or other storage spaces for packages 109 (e.g., lockers or the like). In some embodiments, shelves 103 may include weight sensors or other sensors configured to detect the presence or absence of packages 109 on the shelves 103. Package room 105 may include one or more computing and/or interface devices (e.g., tablet 104 or other computer including video display 106 and/or audio display 107, monitor 108, etc.). As discussed below, packages may be labeled with labels 110. In some embodiments, package room 105 may include a label printer or other device configured to create and/or mark packages 109 with the labels 110. Features and functions of these components are described in greater detail below in the discussions of package room processing flows.

Components within the package room 105 may communicate with other devices, including those outside the package room 105, by network connection (e.g., Internet 111 or other network). In some embodiments, such devices may include cameras 100, computing devices such as tablets 104, package room cloud servers 102, and/or user devices 101. The interactions between these devices are described in greater detail below in the discussions of package room processing flows. Example system architecture for some embodiments of the system of FIGS. 1 and 2 are provided in greater detail in FIGS. 9-12 below.

Package Room Processes

Figure 3:
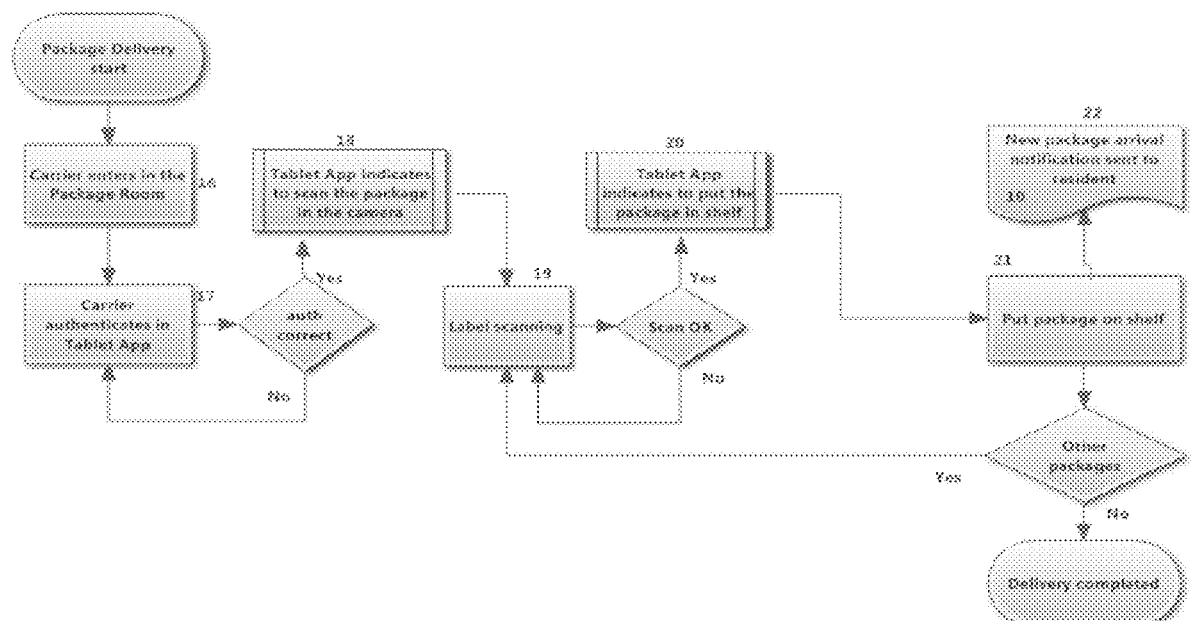
FIG. 3 is an example process flow of an incoming package delivery by deliverer according to an embodiment of the invention.

FIG. 3 is an example process flow of an incoming package 109 delivery by deliverer according to an embodiment of the invention. Package room server 102 may generate a deliverer authentication code and provide the code to the deliverer at a deliverer computing device (e.g., via text, email, or other communication). The deliverer authentication code may be required to accept delivery of the package 109. The deliverer employee who is delivering the package 109 may be informed about the deliverer code prior to entering the package room 105.

In 16, the deliverer employee may be granted access to the package room 105. In 17, a device inside the package room 105 may authenticate the deliverer. For example, various signs may be present in the package room 105 to indicate that an authentication code or method may be required to be entered using tablet 104. In some embodiments, the code may be a PIN to be entered into a keypad or a QR code to be scanned by a scanner. In some embodiments, the user may be authenticated in other ways (e.g., facial recognition, voice recognition, fingerprint recognition, near field communications and/or location based service interaction with a user's mobile device, etc.). In some embodiments, authentication may be performed by the deliverer scanning a package and, if the package is marked as "out for delivery" (thus confirming the package is in the possession of the deliverer), access may be granted. Tablet 104 may receive and examine the entered code to determine whether it is correct. If authentication is successful, in 18, tablet 104 may inform the deliverer (e.g., via tablet display 106, other visual display, and/or via audio 107) to scan (read) package 109 labels 110 into the system.

In 18, the deliverer may scan the package label 110 into the high-resolution label reader camera 100. The camera 100 may be connected to the tablet 104 and/or other computers (e.g., package room server 102) which may record package 109 data from the scan. In case of an authentication failure, a corresponding audio and visual/image message may be provided. If the package label scanning (reading) is completed successfully, in 20, the tablet 104 may indicate to put the package 109 on the shelf 103, otherwise an appropriate audio and video message may be provided from the tablet 104.

In 21, the package 109 may be placed on the shelf 103. In some embodiments, the shelf 103 may detect placement of the package 109 (e.g., by weight sensor, RFID sensor reading RFID tag on package 109, etc.). When the package 109 is on the shelf 103, in 22, one or more notifications may be sent to recipient regarding the new package arrival. For example, server 102 may send emails, text messages, app notifications, etc. to recipients. In case the deliverer has more packages to deliver, the same procedure may be followed without the need to re-authenticate.

Figure 4:
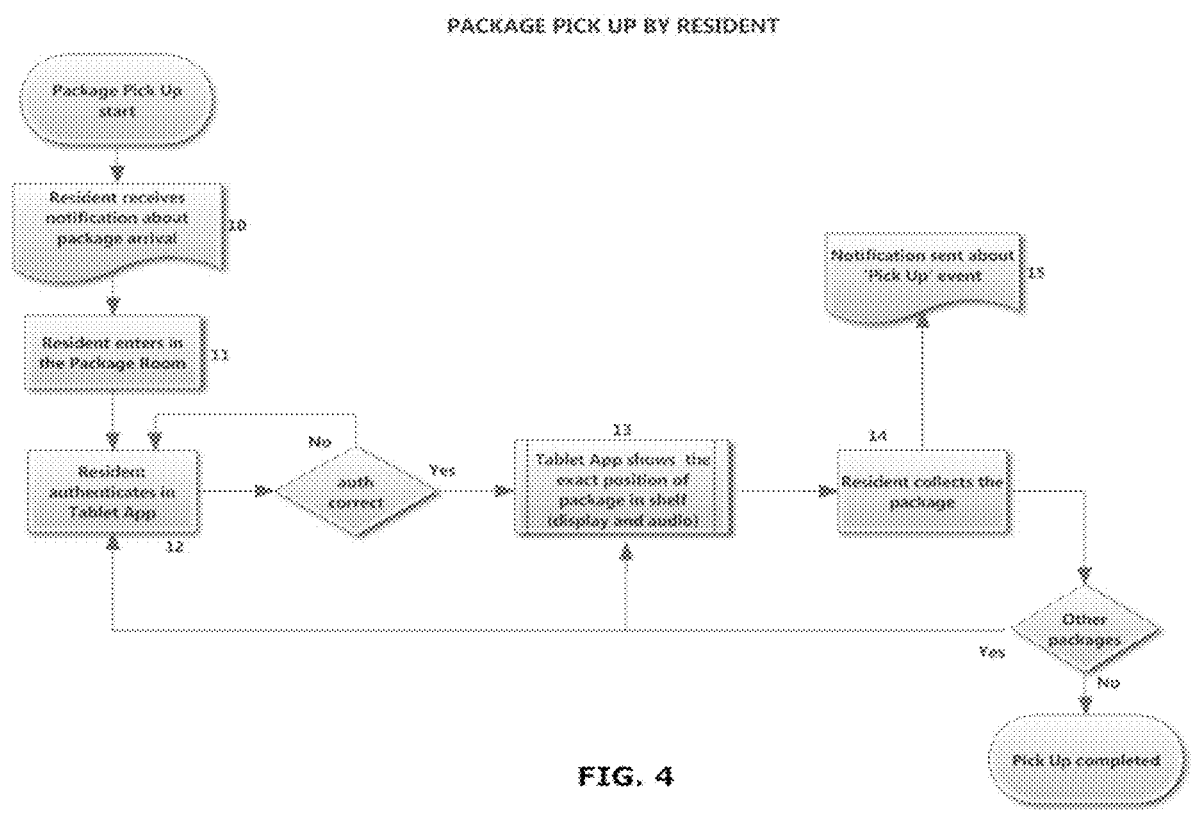
FIG. 4 is an example process flow of an incoming package pick up by retriever according to an embodiment of the invention.

FIG. 4 is an example process flow of an incoming package pick up by retriever according to an embodiment of the invention. This process may occur after the process of FIG. 3 (i.e., after there are packages available for pickup).

As noted above, in 10, server 102 may send notice to the recipient (e.g., to a recipient's computing device) about package 109 arrival. The notice may include an authentication code or method. In some embodiments, the code may be a PIN to be entered into a keypad or a QR code to be scanned by a scanner. In some embodiments, the user may be authenticated in other ways (e.g., facial recognition, voice recognition, fingerprint recognition, near field communications and/or location based service interaction with a user's mobile device, etc.). In 11, the recipient may be granted access to the package room 105. In 12, a device inside the package room 105 may authenticate the recipient. For example, various signs may be present in the package room 105 to indicate that an authentication code or method may be required to be entered using tablet 104. Tablet 104 may receive and examine the entered code to determine whether it is correct. If authentication is successful, in 13, tablet 104 may inform the recipient (e.g., via tablet display 106, other visual display, and/or via audio 107) where their package 109 is located within the package room 105. In case of an authentication failure, a corresponding audio and video message may be provided.

In 14, the tablet 104 and/or other computers (e.g., package room server 102) may determine that the recipient has collected their package (e.g., from input from shelf 103 sensors, camera 100, etc.). In response, an appropriate audio and video message may be provided from the tablet 104 and/or other parts of the system to confirm the operation. In 15, a confirmation message (e.g., email, text, app notification, etc.) may be sent to the recipient's device. If the person retrieving the package has more than one package to collect, the tablet 104 or other parts of the system may inform that person of the correct number and position of any and all incoming packages through audio and/or video after authentication in the same manner as the first package.

Figure 5:
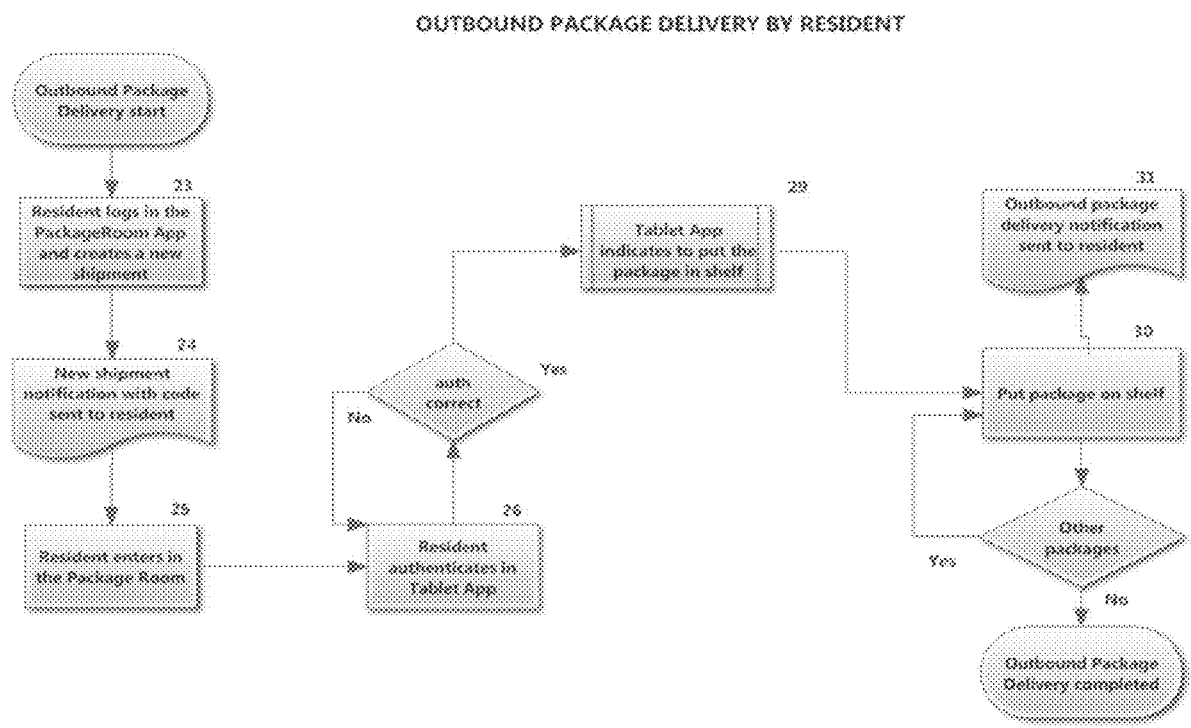
FIG. 5 is an example process flow of an outgoing package delivery by retriever according to an embodiment of the invention.

FIG. 5 is an example process flow of an outgoing package delivery by retriever according to an embodiment of the invention. A user (e.g., building resident or office worker) may be able to place an outgoing delivery in the package room 105 for pickup by a deliverer.

For example, in 23, a user may access an app (e.g., using a personal computer, smartphone, or other computing device such as those described above) and enter package information. The server 102 may receive this information. In some embodiments, a retriever authentication (e.g., username and password credentials) may be required prior to providing access to the app.

In 24, a notification may be sent to the user about the current event. An authentication code may be sent to the user with the notification. In 25, the user may attain access to the package room 105 in order to pick up the outgoing package. For example, various signs may be present in the package room 105 to indicate that an authentication code or method may be required to be entered using tablet 104. In 26, user may enter the code. Tablet 104 may receive and examine the entered code to determine whether it is correct. If authentication is successful, in 27, tablet 104 may inform the user (e.g., via tablet display 106, other visual display, and/or via audio 107) to scan the package using the camera 100.

In case of an authentication failure, a corresponding audio and video message may be provided.

In 28, tablet 104 may register the scanned package. In 29, tablet 104 may indicate to put the package on the shelf 103. If scanning fails, an appropriate audio and video message may be provided from the tablet 104. In 30, the package may be detected as placed on the shelf 103 (e.g., by weight sensor, camera, RFID sensor, etc.). In 31, one or more notifications may be sent to the user regarding the current package delivery. If the user has more packages to deliver, the same procedure may be followed without the need to re-enter the authentication code in the tablet 104.

Figure 6:
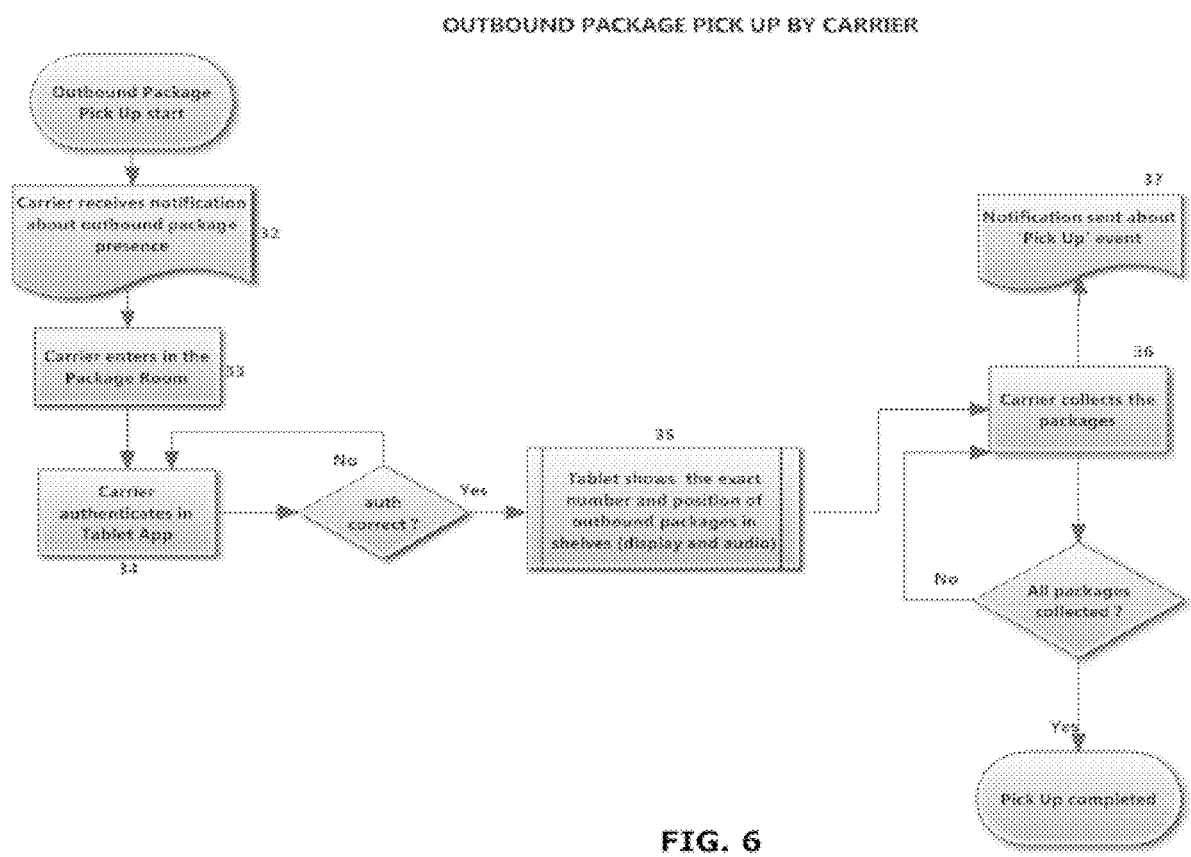
FIG. 6 is an example process flow of an outgoing package pickup by deliverer according to an embodiment of the invention.

FIG. 6 is an example process flow of an outgoing package pickup by deliverer according to an embodiment of the invention. This process may be performed after the process of FIG. 5 (i.e., after there are packages available for delivery).

In 32, the deliverer may receive a notification (e.g., at a computing device) regarding the presence of one or more outbound packages. In 33, the deliverer may be granted access to the package room 105. In 34, a device inside the package room 105 may authenticate the deliverer. For example, various signs may be present in the package room 105 to indicate that an authentication code or method may be required to be entered using tablet 104. Tablet 104 may receive and examine the entered code to determine whether it is correct. If authentication is successful, in 35, tablet 104 may inform the deliverer (e.g., via tablet display 106, other visual display, and/or via audio 107) where the package for pickup is located within the package room 105. In case of an authentication failure, a corresponding audio and video message may be provided.

In 36, if the deliverer picks up the right package, an appropriate audio and video message may be provided from the tablet 104 to confirm the operation. In 37, a confirmation message (e.g., an email, text, app notification, etc.) may be sent to the retriever about the current event. If there is more than one package to collect, the tablet 104 may inform the deliverer with the correct number and position of the outgoing packages through audio and video at the authentication phase in the same manner as described above for the first package.

Package States

As a package is processed according to the methods described above, server 102, tablet 104, and/or other computers in the package room system may track the state of the package based on user interactions with tablet 104 and/or sensor readings (e.g., weight sensors, RFID sensors, cameras, etc.) as described above. This may occur for both inbound and outbound packages.

In some embodiments, when the package 109 is placed on the shelf 103, the sensors (e.g., weight sensor; RFID sensor; camera; penetrating scanning sensor such as x-ray or infra-red scanner; 3D scanning sensor such as 3D scanner, LIDAR, radar, or WiFi; etc.) may send detected package data to the tablet 104 and/or package room server 102 which may generate a unique digital identifier (UDI) for the package. For example, a package may be uniquely identifiable from information including package weight, package addressee, package dimensions, package external markings determined by computer vision processing of camera inputs (e.g., coloring of the overall package, coloring of specific parts of the package, printing on the package, placement of tape on the package, overlapping of tape, marks on packaging, nicks or dents in the packaging, etc.), RFID data, 3D package scan, package contents determined or estimated from penetrating scan, and/or a combination thereof. From this data, tablet 104 and/or package room server 102 may generate a UDI for the package. As the package is processed according to the processes described above, the state associate with a UDI may be updated by tablet 104 and/or package room server. In some embodiments, the user's authentication (discussed above) and the UDI may be used to confirm the user is taking the right package, triggering an alarm or other action (described below) if not.

Figure 7:
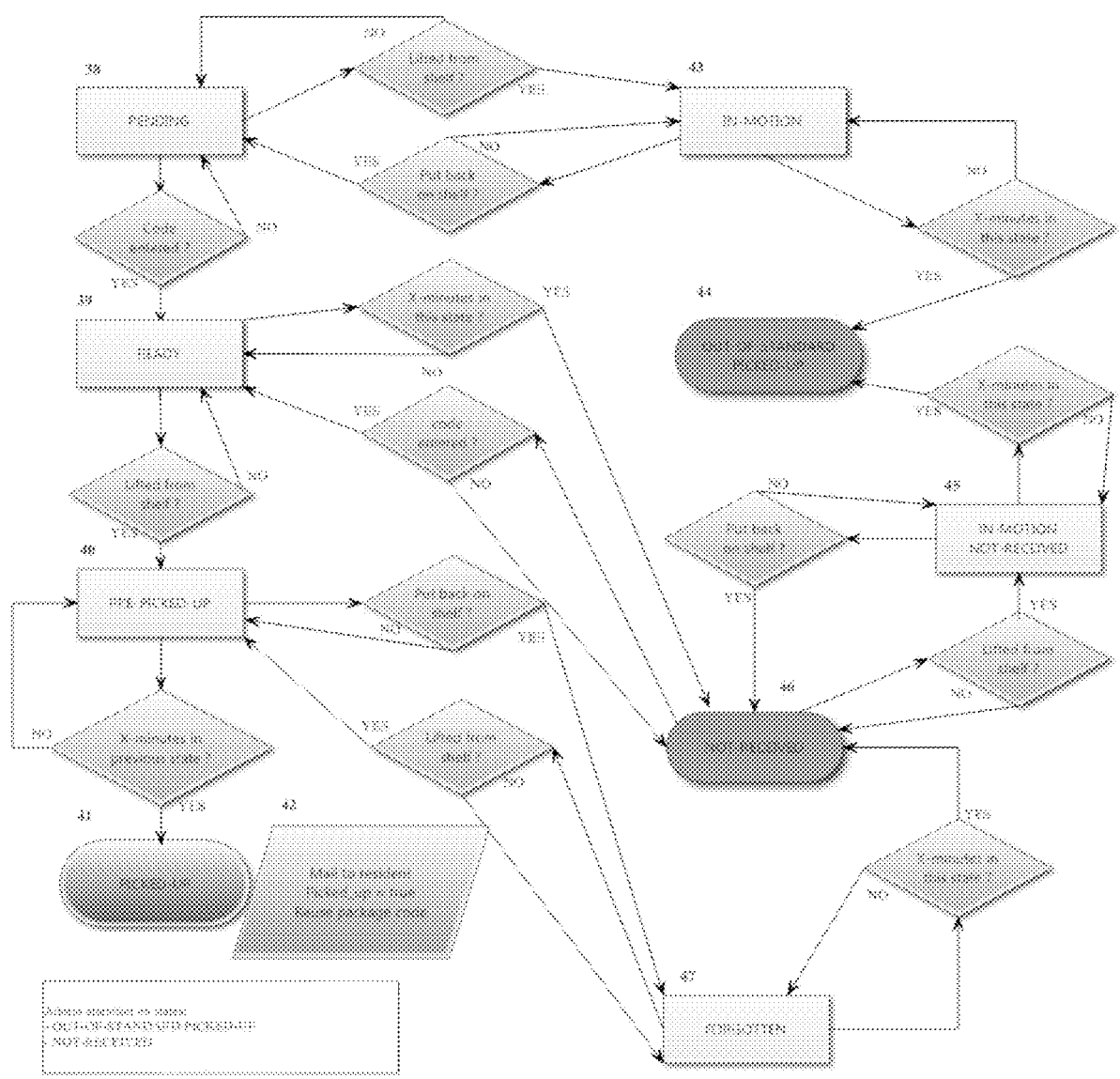
FIG. 7 is an example workflow of the states of an incoming package according to an embodiment of the invention.

FIG. 7 is an example workflow of the states of an incoming package according to an embodiment of the invention. A package may be in the 'pending' state 38 when it enters the system for the first time by deliverer (e.g., after the deliverer has placed the package on the shelf 103). If the retriever enters correctly the corresponding authentication code in the tablet 104 inside the package room 105, the package may move from 'pending' state to 'ready' state 39. If the retriever lifts the package from the shelf (e.g., which may be detected by weight sensor, camera, etc.), the package may go in the 'pre-picked-up' state 40. If the package stays more than a predefined amount of time (e.g., one minute) in this state it may move to the final 'picked-up' state 41. A package in the 'pre picked up' state may go to the temporary 'forgotten' state 47 if it is put back on the shelf, and may turn back to the picked-up state 41 if it is lifted again from the shelf or the 'not received' state 46 if it stays in the 'forgotten' state 47 for more than a predefined amount of time (e.g., one minute).

Packages that enter and remain in the picked-up state 41 may be registered as received (e.g., by server 102 and/or tablet 104), which may trigger receipt notifications and/or clearing of the package from the system.

If the package in the 'pending' state 38 is lifted from the shelf without a previous entry of the corresponding authentication code, it may go to the 'in-motion' state 43. The package may turn back to the 'pending' state 38 if it is put back on a shelf. Otherwise, if it stays more than a predefined amount of time (e.g., one minute) in 'in-motion' state 43, it may go to final 'out of standard picked up' state 44. A package in the 'ready' state may go to the 'not received' state 46 if it stays more than a predefined amount of time (e.g., one minute) in the current state. If the package in the 'not received' state 46 is lifted from the shelf, it may go to the temporary 'in motion not received' state 45. From this state it may turn back to 'not received' state 46 if it is put back on shelf, or it may go to the 'out of standard picked up' 44 state if it stays more than a predefined amount of time (e.g., one minute) in the current state.

Packages that enter and remain in the not received state 46 may trigger actions such as sending alerts to recipient devices (e.g., from server 102 and/or tablet 104) and/or building staff to prompt pickup of the package.

Packages that enter and remain in the out of standard picked up state 44 may trigger actions by server 102 and/or tablet 104 to help prevent or recover unauthorized package retrieval. For example, visual and/or audio alerts may advise the person in the package room that they have removed a package that is not theirs. Additionally, sensors (e.g., camera 100) may record and save video or images to help identify the person if they leave with the package and therefore carry out a package theft. When the unauthorized package has been removed from the room, server 102 and/or tablet 104 may send emails/texts/etc. containing details (time logs, video, pictures, etc.) to the owner of the package and/or the apartment community management for further legal/other action(s).

Figure 8:
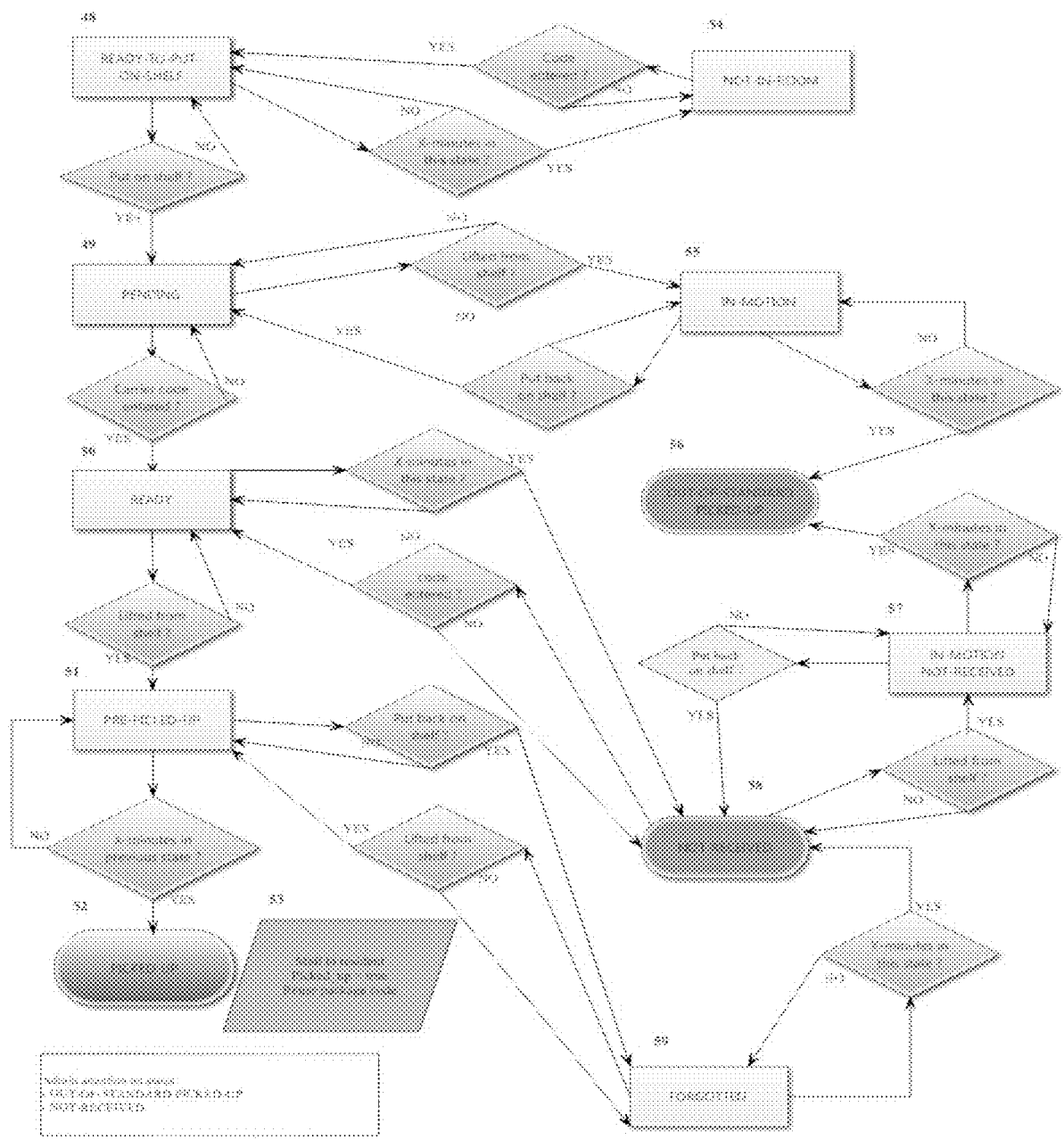
FIG. 8 is an example workflow of the states of an outgoing package according to an embodiment of the invention.

FIG. 8 is an example workflow of the states of an outgoing package according to an embodiment of the invention. A package may be in the 'not in room' state 54 when it enters the system for the first time. This may be the moment when the retriever creates the outgoing package record from an app on their device or the tablet 104, for example Later, if the retriever enters correctly the corresponding authentication code in the tablet 104 (or correctly authenticates by other means like visual and facial recognition) inside the package room 105 or outside at the entry, the package may move to the 'ready to put on shelf' state 48. The package may go back to the previous state if it stays more than a predefined amount of time (e.g., one minute) in the current state. The package may go to the 'pending' state 49 if the retriever puts it on the shelf. The 'pending' state 49 may be a final state from the retriever point of view in creating an outgoing package, and a beginning state from the point of view of a deliverer who is picking it up for returning or as an outgoing shipment.

Later, if the deliverer successfully authenticates (entering successfully the authentication code in the tablet 104 or otherwise), the system may indicate to him/her the presence of current outgoing packages in the shelves. At this point the outgoing package(s) pertaining to deliverer may go in the 'ready' state 50 so they may be picked up. If the deliverer lifts the package from the shelf, it may go to the 'pre-picked-up' state 51. If it stays more than a predefined amount of time (e.g., one minute) in this state, it may move to the 'picked-up' state 52. A package in the 'pre picked up' state 51 may go to the temporary 'forgotten' state 59 if it is put back on the shelf and may turn back to the previous state if it is lifted again from the shelf. The package may go to the 'not received' state 58 if it stays in the 'forgotten' state for more than a predefined amount of time (e.g., one minute).

Packages that enter and remain in the picked-up state 52 may be registered as received by the deliverer (e.g., by server 102 and/or tablet 104), which may trigger delivery progress notifications and/or clearing of the package from the system.

If the package in the 'pending' state 49 is lifted from the shelf without previous authentication (such as entering the corresponding authentication code), it may go to the 'in-motion' state 55. The package may turn back to the 'pending' state 49 if it is put back on a shelf. Otherwise, if the package stays more than a predefined amount of time (e.g., one minute) in 'in-motion' state 55, it may go to 'out of standard picked up' state 56. A package in the 'ready' state 50 may go to the 'not received' state 58 if it stays more than a predefined amount of time (e.g., one minute) in the current state. If the package in the 'not received' state 58 is lifted from the shelf, it may go to the temporary 'in motion not received' state 57. From this state it may turn back to 'not received' state 58 if it is put back on shelf, or it may go to the 'out of standard picked up' state 56 if it stays more than a predefined amount of time (e.g., one minute) in the current state.

Packages that enter and remain in the not received state 58 may trigger actions such as sending alerts to deliverer devices (e.g., from server 102 and/or tablet 104) and/or building staff to prompt pickup of the package.

Packages that enter and remain in the out of standard picked up state 56 may trigger actions by server 102 and/or tablet 104 to help prevent or recover unauthorized package retrieval. For example, visual and/or audio alerts may advise the person in the package room that they have removed a package that is not theirs. Additionally, sensors (e.g., camera 100) may record and save video or images to help identify the person if they leave with the package and therefore carry out a package theft. When the unauthorized package has been removed from the room, server 102 and/or tablet 104 may send emails/texts/etc. containing details (time logs, video, pictures, etc.) to the owner of the package and/or the apartment community management for further legal/other action(s).

Package Room Systems

Systems and techniques according to the present disclosure may provide a secure method of package delivery and retrieval. FIGS. 9-12 provide examples of system components that may be used to implement the systems and methods of FIGS. 1-8.

Figure 9:
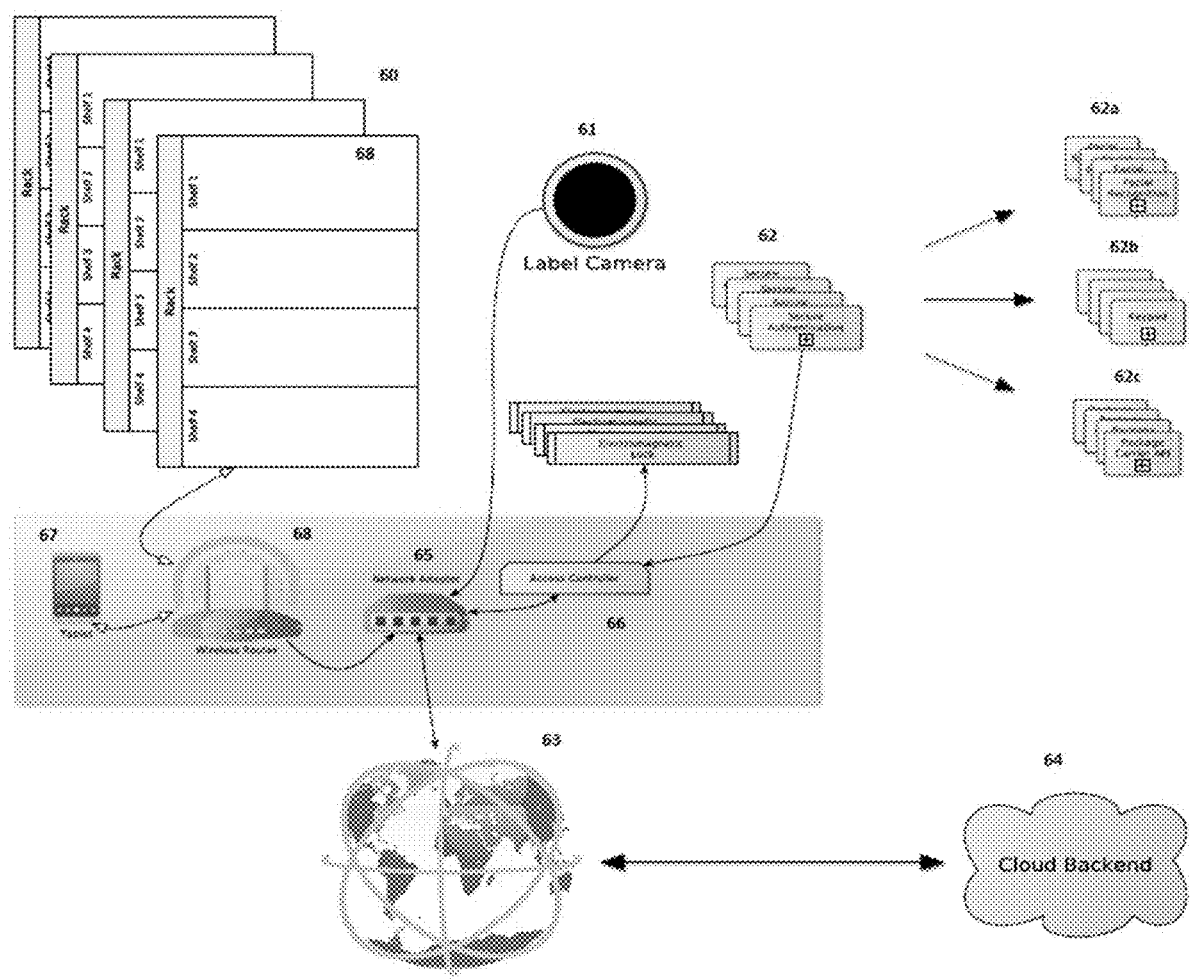
FIG. 9 is an example set of authentication mechanisms for users to access the system according to an embodiment of the invention.

FIG. 9 is an example set of authentication mechanisms for users to access the system according to an embodiment of the invention. In some embodiments, the package room may include components such as weight sensitive shelves 60, label reading camera 61, and tablet 67. Each of these components may communicate with backend servers 64 through the web 63. The communication may be granted only if a specific authentication procedure is previously completed with success in some embodiments.

The shelves of a room may be grouped in one or more racks of shelves 68. Each of the shelves may contain a number of weight sensors in order to provide information about their current status (number of packages, weight of packages, position of packages). The shelves 68 may include a processor or other computing device, including a network interface, coupled to the sensors to collect the sensor data and send it to the servers 64. Some shelves may be refrigerated or provided with dry ice or the like for perishable items.

The label reading camera 61 may likewise include a processor or other computing device including a network interface configured to communicate to the remote servers 64 in order to send photo data to the servers 64.

The tablet 67 may interact with the remote backend 64 through a wireless interface in order to carry out the communication between system and the different actors that take place. These actors, such as deliverers, retrievers, administrators, and managers, may interact with the ecosystem in controlled ways through secure authentication procedures.

In order to facilitate and guarantee the user access to the system, a number of authentication methods 62 may be implemented, such as facial recognition 62a, passcode keypad entry 62b, or Web API authentication. If access is granted, an access controller 66 may allow a user to place or remove a package (e.g., by unlocking an electromagnetic lock to the package room and/or the specific shelf on which the package is/is to be located). The authentication methods 62 may allow access only to packages whose status is read as "out for delivery" from the deliverer 62c. In some embodiments, the locks may fail secure (e.g., if power is lost, they may remain locked). Shelving may be arranged on lockable wheels (e.g., locked by key) with backs of shelving open, but against a wall, and fronts of shelving accessible only by locking door. If there is an emergency need to access the inside of the shelving (e.g., to retrieve an emergency package), a building staff member may be able to unlock the wheels and roll the shelving away from the wall. Alternatively, the shelving may be accessible by a secondary (e.g., rear) door that a building staff member can unlock by key or code.

Figure 10:
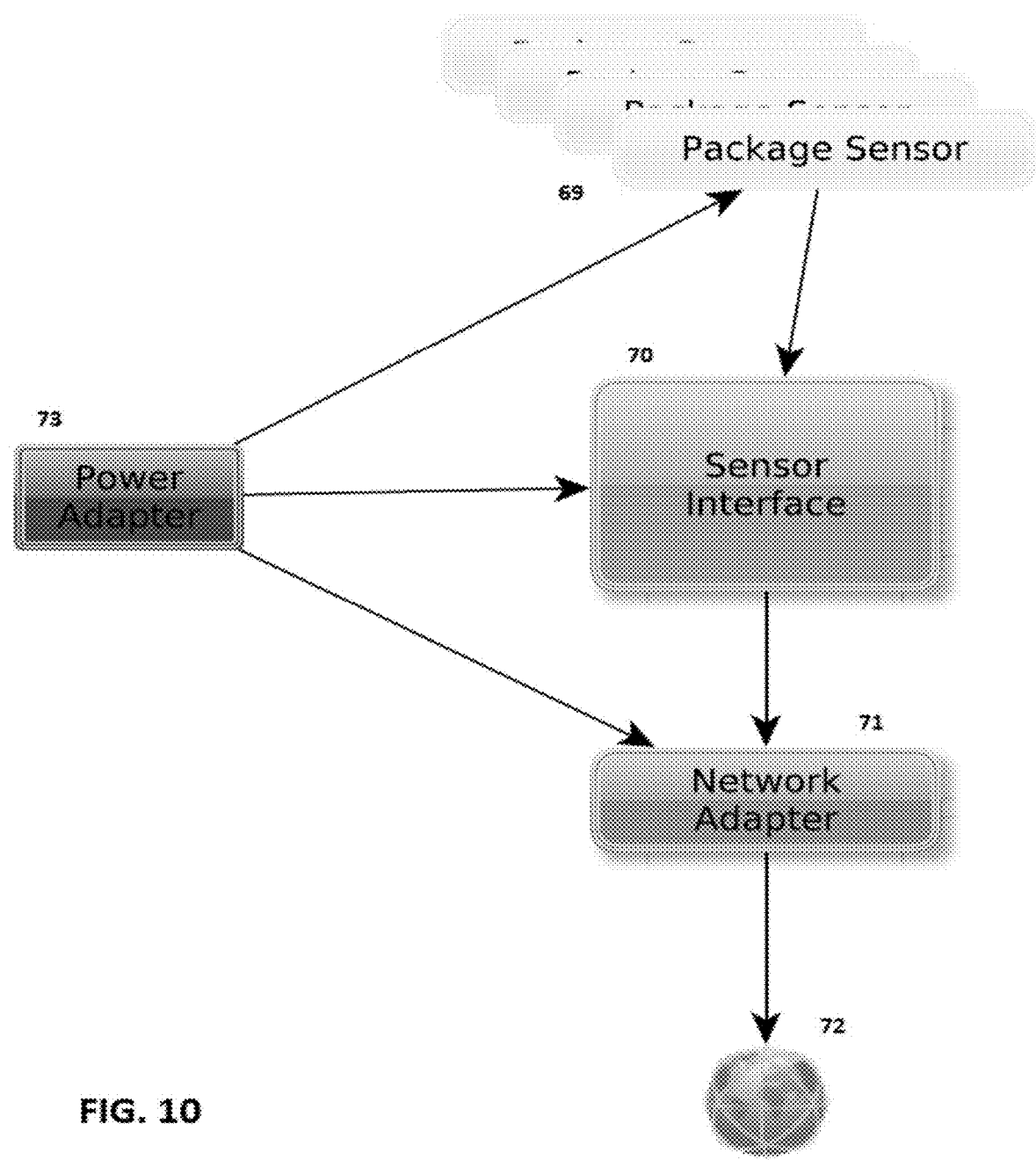
FIG. 10 is an example set of electrical and network components of one shelf according to an embodiment of the invention.

FIG. 10 is an example set of electrical and network components of one shelf according to an embodiment of the invention. In some embodiments, each shelf may have a number of weight sensors 69 that present an interface with static readings of the current status of the shelf (e.g., number of packages, weight of packages, and position of packages). The sensors 69 may be connected to an interface board 70. The shelves may be organized in groups called racks 68. Each rack 68 may include one embedded single board computer connected to a number of interface boards 70 that may connect via wired or wireless interface 71 to a remote backend 72. Each shelf may connect to its own power supply. The shelves' communication with the backend servers 72 may be permitted only after a successfully completed authentication procedure in some embodiments.

Figure 11:
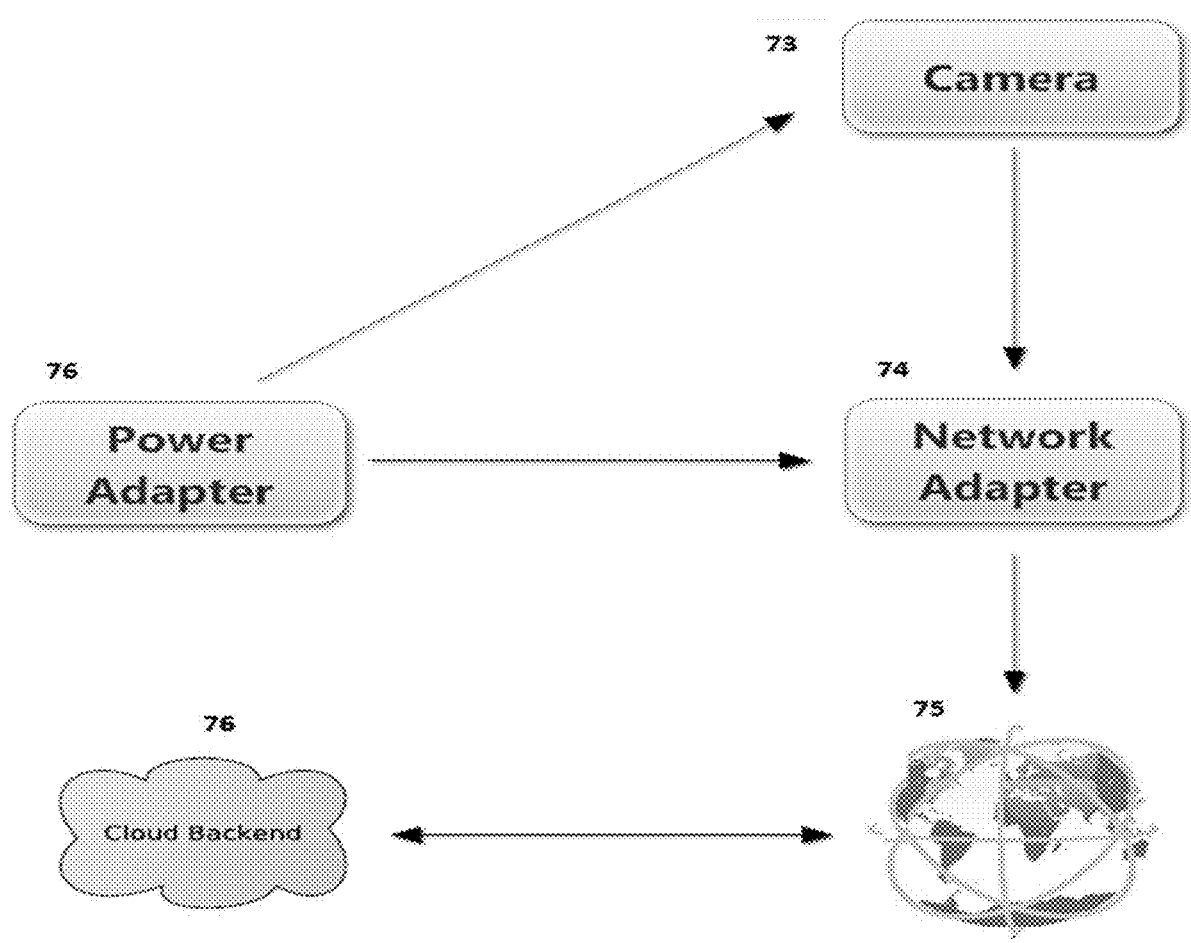
FIG. 11 is an example network diagram of a camera connected to the system according to an embodiment of the invention.

FIG. 11 is an example network diagram of a camera connected to the system according to an embodiment of the invention. The system may include a label reading high resolution camera 73. The camera 73 may communicate with the backend servers 76 through a network interface 74. For example, photos collected by the camera may be delivered to a specific web location 75. Backend servers 76 may read and process the images in conformance with the system logic. The camera communication with the backend servers may be granted only after a successfully completed authentication procedure in some embodiments.

Figure 12:
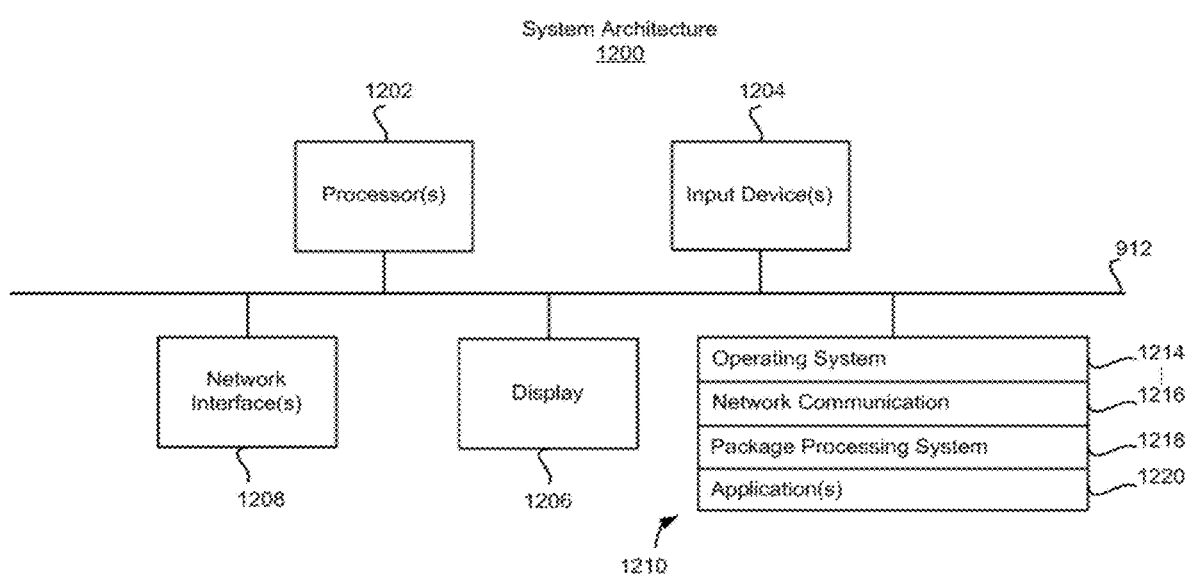
FIG. 12 is an example system architecture configured for package room processing according to an embodiment of the invention.

FIG. 12 is a block diagram of an example system architecture 1200 that may implement the features and processes of FIGS. 1-8. For example, package room server(s) 102 and/or computing devices installed in the package room may use example system architecture 1200 in some embodiments. Package room server(s) 102 may provide some or all backend services discussed with respect to FIGS. 1-11 in some embodiments.

The architecture 1200 may be implemented on any electronic device that runs software applications derived from compiled instructions, including without limitation personal computers, servers, smart phones, media players, electronic tablets, game consoles, email devices, etc. In some implementations, the architecture 1200 may include one or more processors 1202, one or more input devices 1204, one or more display devices 1206, one or more network interfaces 1208, and one or more computer-readable mediums 1210. Each of these components may be coupled by bus 1212.

Display device 1206 may be any known display technology, including but not limited to display devices using Liquid Crystal Display (LCD) or Light Emitting Diode (LED) technology. Processor(s) 1202 may use any known processor technology, including but not limited to graphics processors and multi-core processors. Input device 1204 may be any known input device technology, including but not limited to a keyboard (including a virtual keyboard), mouse, track ball, and touch-sensitive pad or display. Bus 1212 may be any known internal or external bus technology, including but not limited to ISA, EISA, PCI, PCI Express, NuBus, USB, Serial ATA or FireWire. Computer-readable medium 1210 may be any medium that participates in providing instructions to processor(s) 1202 for execution, including without limitation, non-volatile storage media (e.g., optical disks, magnetic disks, flash drives, etc.), or volatile media (e.g., SDRAM, ROM, etc.).

Computer-readable medium 1210 may include various instructions 1214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 1204; sending output to display device 1206; keeping track of files and directories on computer-readable medium 1210; controlling peripheral devices (e.g., disk drives, printers, etc.) which can be controlled directly or through an I/O controller; and managing traffic on bus 1212. Network communications instructions 1216 may establish and maintain network connections (e.g., software for implementing communication protocols, such as TCP/IP, HTTP, Ethernet, etc.).

A package processing system 1218 can include instructions that may use or implement the processes described in reference to FIGS. 1-8. Application(s) 1220 may be an application that uses or implements the processes described in reference to FIGS. 1-8 and/or other processes. The processes may also be implemented in operating system 1214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, the specification discloses several examples wherein the package room is located in an apartment building and the recipients are residents, but those of ordinary skill in the art will appreciate that other situations are possible and may involve similar systems and methods. Other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A package room system comprising:
   a plurality of shelves;
   a data entry device that comprises a label reading scanner;
   a plurality of weight sensors coupled to the plurality of shelves, each weight sensor configured to sense a weight of an object placed on at least one of the plurality of shelves and output the sensed weight;
   a computer coupled to the plurality of weight sensors and the data entry device, the computer configured to:
      receive data concerning a package from the at least one data entry device, wherein the received data comprises label data identifying an addressee of the package;
      generate a code associated with the package;
      receive a sensed weight of the package on one of the plurality of shelves from at least one of the plurality of weight sensors;
      detect a placement of the package at a position on one of the plurality of shelves based on the received sensed weight of the package on the one of the plurality of shelves;
      record the position on the plurality of shelves of the package, the code associated with the package, and the sensed weight of the package;
      notify the addressee of the package of a presence of the package on the plurality of shelves by transmitting the code associated with the package to a pre-stored mobile device number of the addressee;
      receive, at the data entry device, the code associated with the package as input to the data entry device;
      identify the position of the package on the plurality of shelves based on the received code;
      detect removal of the package from the one of the plurality of shelves based on a sensed weight change received from at least one of the plurality of weight sensors; and
      record the removal of the package as an authorized removal based on the recorded weight of the package and the sensed weight change.

2. The package room system of claim 1, further comprising:
an RFID sensor;
wherein computer is coupled to the third sensor and is further configured to:
receive RFID data from the RFID sensor comprising data identifying the package on the plurality of shelves based on an RFID tag applied to the package; and
detect removal of the package from the plurality of shelves based on subsequent RFID data received from the RFID sensor.

3. The package room system of claim 1, wherein the computer is further configured to:
record the removal of the package from the plurality of shelves as an authorized removal based on receiving the code associated with the package at the at least one data entry device.

4. The package room system of claim 1, further comprising an image sensor that comprises at least one camera configured to record the plurality of shelves.

5. The package room system of claim 1, further comprising a locking mechanism configured to restrict access to the at least one shelf.

6. The package room system of claim 5, wherein the computer is further configured to:
receive the code associated with the package from the data entry device; and
unlock the locking mechanism based on receiving the code associated with the package from the data entry device.

7. The package room system of claim 1, wherein the computer is further configured to receive data from the data entry device concerning an outgoing package to be retrieved by a carrier.

8. A package room management method comprising:
receiving, by a computer, data concerning a package to be placed on a shelf from a data entry device, wherein the received data comprises label data identifying an addressee of the package;
upon identification of the matched addressee, generating a code associated with the package;
receiving, by the computer, a sensed weight of the package on the shelf from a weight sensor comprising a sensed weight of the package on the shelf;
detecting, by the computer, a placement of the package on the shelf, based on receiving the sensed weight;
recording the placement of the package on the shelf, the code associated with the package, and the sensed weight of the package;
notifying, by the computer, the matched addressee of the package of a presence of the package on the shelf by transmitting the code associated with the package to a pre-stored mobile device number of the matched addressee;
receiving, at the data entry device, the code associated with the package from the addressee;
identifying the placement of the package on the shelf based on the received code;
detecting, by the computer, removal of the package from the shelf based on receiving a sensed weight change from the weight sensor; and
recording the removal of the package as an authorized removal based on the recorded weight of the package and the sensed weight change.

9. The package room management method of claim 8, further comprising:
receiving, by the one computer, data identifying the package on the shelf from an RFID sensor; and
detecting, by the at least one computer, the removal of the package from the at least one shelf based on receiving subsequent RFID data from the third sensor.

10. The package room management method of claim 8, further comprising:
recording, by the computer, the removal of the package from the shelf as an authorized removal based on receiving the code associated with the package on the shelf from the data entry device.

11. The package room management method of claim 8, further comprising:
receiving, by the computer, visual data from a camera configured to record the shelf.

12. The package room management method of claim 8, further comprising restricting, by a locking mechanism, access to the shelf.

13. The package room management method of claim 12, further comprising:
receiving, by the computer, the code associated with the package on the shelf from the data entry device; and
unlocking, by the computer, the locking mechanism based on receiving the code associated with the package on the data entry device.

14. The package room management method of claim 8, further comprising receiving, by the computer, data from the data entry device concerning an outgoing package to be retrieved by a carrier.

* * * * *